Oct. 19, 1943.    S. HIGGINS    2,332,447
PROCESS OF PRODUCING MULTICOLORED POTTERY
Filed Dec. 26, 1939    2 Sheets-Sheet 1

Inventor.
Sheridan Higgins.
Attorneys

Oct. 19, 1943.                S. HIGGINS                  2,332,447
              PROCESS OF PRODUCING MULTICOLORED POTTERY
                      Filed Dec. 26, 1939          2 Sheets-Sheet 2

Inventor.
Sheridan Higgins.
Attorneys.

Patented Oct. 19, 1943

2,332,447

UNITED STATES PATENT OFFICE 2,332,447

PROCESS OF PRODUCING MULTICOLORED POTTERY

Sheridan Higgins, Van Nuys, Calif.

Application December 26, 1939, Serial No. 310,879

7 Claims. (Cl. 25—156)

This invention relates generally to multicolored pottery and to processes for making same, the general object of the invention being to provide an improved process for making multicolored pottery having sharply demarked color designs which run completely through the finished article, as distinguished from surface designs.

A further of the invention is the provision of a pottery making process by which novel and highly ornamental repeat or duplication designs may be produced.

A still further object of the invention is the provision of a novel and improved turning process by which multicolored pottery articles may be formed into desired shapes on a revolving mold without causing the "through" colors of the article to run, blend or blur at the surfaces contacted by the modeling tools.

The molding process which is a part of the present invention may be utilized in molding pottery having any type of coloring, whether or not of multicolored design, and the herein disclosed and claimed process for producing one type of multicolor design is therefore not to be regarded as a limitation on the molding process, or on those claims not limited to the particular type of multicolor design disclosed herein.

The disclosed process for producing a type of duplication multicolor design preferably includes as an integral part thereof the novel molding process referred to above, as this assures avoidance of blurring and blending of the design colors at the surface of the article. However, certain of my broader claims are not so limited, since variational shaping procedures may be found adequate under certain circumstances.

The invention in its several aspects will be best understood by referring now to the accompanying drawings and to the following detailed description of typical procedures in accordance with the invention. In the drawings.

Figure 1:
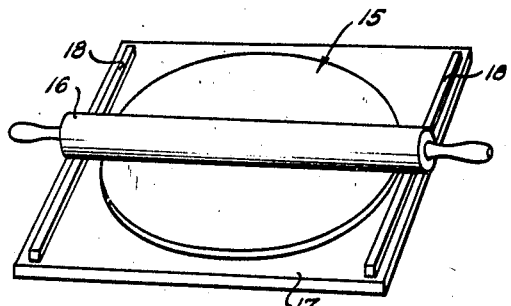
Fig. 1 shows a slab of clay being rolled out to desired thickness on a work table.

There is first taken a suitable quantity of plastic clay, of some desired base color or colors, which is rolled out into a perfectly flat and uniform-thickness slab 15 of "pan-cake shape," as indicated in Fig. 1. For this purpose, there may be employed a roller 16 and work table 17, the table being furnished with guide strips 19 for the roller to determine the thickness of the slab.

Figure 2:
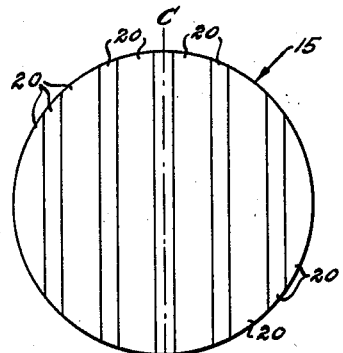
Fig. 2 shows the slab of clay cut into a number of parallel strips.

The clay slab 15 is then severed into a number of parallel sections or strips, as typically indicated in Fig. 2. In the present illustration, ten parallel cuts are made, severing the clay into eleven strips or sections 20. Alternate strips are then removed, so that the clay then appears as in Fig. 3, with spaces intervening between the retained strips. Usually, the cuts are so made that the alternate, removed strips are narrower than the retained strips, for example about in the proportions indicated, so that the spaces between the retained strips are narrower than the latter. This is of course subject to considerable modification, depending upon the type of design sought.

Figure 3:
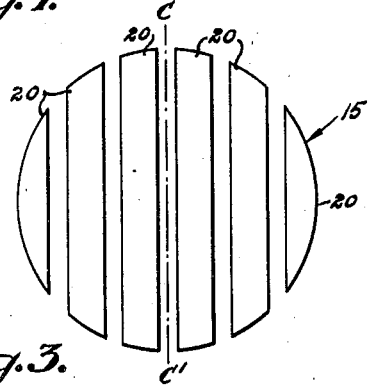
Fig. 3 shows the clay with alternate strips removed.

The same result may be accomplished with less wastage of clay by a modified and preferred procedure consisting of severing a slab of clay of suitable size into six strips, and then spreading apart to such a spacing as indicated in Fig. 3. As here typically shown, the remaining strips are spaced symmetrically on opposite sides of center line C—C'.

Figure 4:
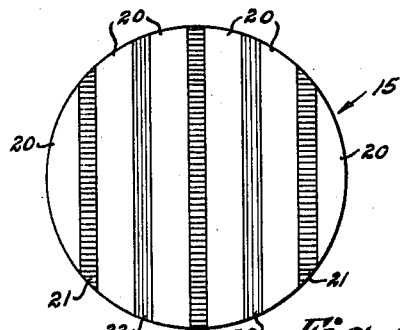
Fig. 4 shows the removed strips replaced by strips of clay of different colors.
Figure 5:
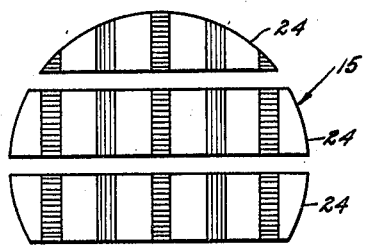
Fig. 5 shows the clay cut into strips at right angles to the first mentioned strips, with spaces between the retained strips.

Strips of clay of a color or colors other than that of the base color or colors are then fitted into the spaces between the strips 20 of Fig. 3, as shown in Fig. 4. In the example here shown, these inserted strips are of two different colors, the middle and outside strips 21 being of one color, as blue, and the intervening strips 22 being of another color, as red. This color selection is of course subject to variation, and the inserted strips may be of any color or colors desired, though the color selection should be symmetrical with reference to center line C—C'.

In accordance with the specific procedure here detailed, the clay is then severed at right angles to the direction of the first mentioned strips, to form a number of parallel sections or strips 24. This may again be done in either of two ways, either by cutting out strips of the clay, or simply by severing the clay and then spreading apart to form the intervening spaces. Strips of clay 25 and 26 of selected colors, as blue and red, are then fitted into the spaces between strips 24, the central strips 26 being of one color and the outside strips 25 being of another color in the particular illustration given. Again, the color selection is open to variation, depending upon the effect finally desired.

Figure 6:
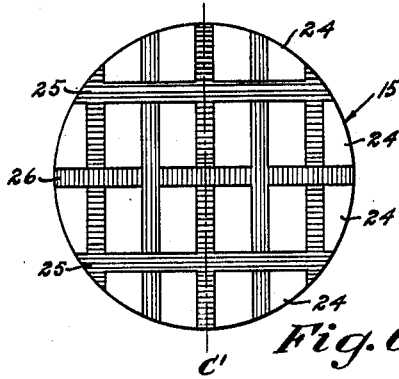
Fig. 6 shows colored strips of clay fitted in the spaces between the horizontal strips of Fig 5.

The inserted strips are worked into or joined together with the adjacent strips by suitable pressure along the edges thereof, so that the slab of Fig. 6 is one integral mass of material.

The number of inserted color strips in both directions, as well as their colors, is of course subject to considerable modification. In some instances the insert strips may all be of the same color, while in others they may be of two or more colors. Moreover, the procedure may be modified by inserting color strips of different numbers and relative widths, as well as by inserting color strips in but one direction. Thus, for example, the insert strips may be inserted in a direction parallel to center line C—C', the transverse inserts being omitted, or the transverse inserts may be employed and the first mentioned inserts (those parallel to C—C') omitted. The complete procedure as detailed above usually results in the most pleasing design, however, and is ordinarily preferred.

Figure 7:
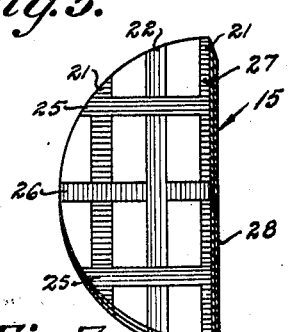
Fig. 7 shows the slab of Fig. 6 after severing on the line of symmetry and folding one half on the other.

The slab of Fig. 6 is next divided into two halves along its center diametrical line C—C', after which the two halves are laid one on the other as indicated in Fig. 7, the two halves being designated in said figure by numerals 27 and 28.

Figure 8:
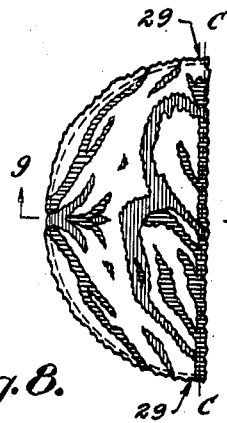
Fig. 8 shows the clay of Fig. 7 following working to form the color design.

The clay, in the half-disk form of Fig. 7, is then worked or wedged until it becomes one mass, after which the "ends" are forced or drawn inwardly by pressure exerted thereon, in the directions of the arrows 29 in Fig. 8, so as to work the color design toward the center of the mass, care being taken to maintain the outline of the mass in its original "half-disk" form. In this procedure, the "half-disk" may be pressed, paddled, struck on one "end" and then othe other, and the two "ends" pressed inwardly toward one another, care always being taken to strike or press the mass in such as way as to preserve the original half-disk outline of the mass. By this procedure the colored insert strips are drawn inwardly and worked about into a design such as typically illustrated in Fig. 8. The color strips of Fig. 7 are thus worked inwardly and about, the color inserts finally assuming some such a design as is depicted in Fig. 8.

The clay mass of Fig. 8 is then divided into two halves by cutting it along a medial plane parallel to its two faces, such as along plane M—M', thus producing two half-disks 30 and 31 of symmetrical color designs. These are placed edge to edge, so as to form a complete disk, the adjacent diametrical edges trimmed, if necessary, so as to match the color designs as perfectly as possible, and the two halves are then joined along center line C—C' and their edges caused to adhere by kneading or paddling. The clay then appears as in Fig. 10, which shows the two half-disks 30 and 31 after joining, the resulting disk D having a duplication color design, which is symmetrical on opposite sides of center line C—C'.

The procedure described yields a completely balanced design, frequently resembling a butterfly, bird, or some other pleasing ornamental form. A little experience enables a given design to be approximately duplicated, though of course no two products of the process will ever be identical in all respects.

As a modification of the procedure detailed above, the double-thickness half-disk of Fig. 7 may be made up directly, by the simple procedure of forming a half-disk of the base color clay of double the thickness of the slab 15 started with in the first described procedure, and then inserting the color strips or sections, such as 21, 22, 25 and 26. The subsequent procedure is the same as before.

Figure 11:
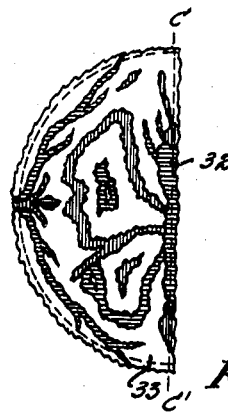
Fig. 11 shows a modification.

The procedure as so far described consists in the insertion of color strips either or both parallel to and at right angles to the center line of symmetry C—C'. It is to be understood, however, that additional effects may be introduced or achieved by inserting colored strips or pieces of any size, shape and direction, or by inserting designs representing butterflies, birds, angels, etc. The insertion of complicated or irregular designs is best and easiest accomplished by first making up a double thickness half-disk of the base color clay, of the shape and size of the clay shown in Fig. 7, but in this instance without the right angled insert strips, and then inserting a design, in the color or colors chosen, such as that of a butterfly. In doing this, portions of the half-disk are cut out, the cuts extending from face to face, and the colored inserts placed in the cut-out openings so made. Fig. 11 shows a half butterfly design 32 so introduced into a half-disk 33. This butterfly design may consist of wings, head, body, wing spots, etc., as well as surrounding design, all of selected colors, as may suit the fancy or taste of the individual. Following introduction of such a design, the half-disk is worked and paddled to cause the introduced clay to join with the base clay, and to cause the colored clay of the introduced design to work somewhat into the base clay. It will be evident that when the half-disk 33 of Fig. 11 is cut into two halves along a medial plane, and the two halves are then joined, a complete balanced butterfly design will be produced. Numerous modifications will occur to the worker, the common characteristic of all the procedures in accordance with the present invention, however, being the severing of a slab of clay having a through color design on a plane parallel to its two faces, and then joining the two resulting halves to produce a duplication or balanced design.

Figure 10:
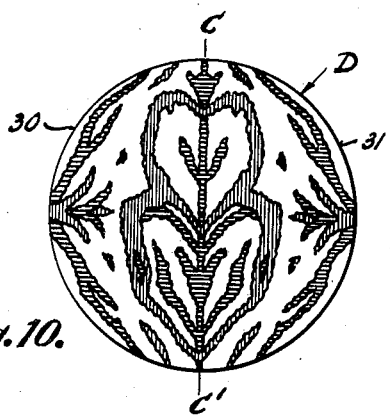
Fig. 10 shows the clay after dividing on a horizontal plane, placing the two halves edge to edge, and joining.
Figure 9:
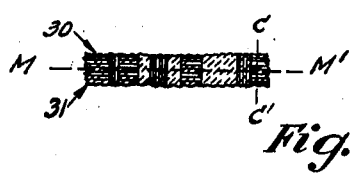
Fig. 9 is a section on line 9—9 of Fig. 8.
Figure 12:
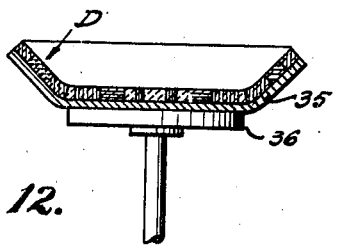
Fig. 12 is a view in vertical medial section showing the clay of Fig. 10 placed within a revolving mold.

Following the production of the clay disk D of Fig. 10 with the introduced color design, of whatever nature the latter may be, the procedure for completing the article is as follows: The clay disk D is rolled to proper thickness for the article to be produced, and is then placed within a revolving mold or pan mounted on a potter's wheel. Fig. 12 shows somewhat diagrammatically a mold 35 mounted on a revolving potter's wheel 36, the mold consisting of a metal or other form which supports the clay in an upright position, so that it can be properly worked with modeling tools. In the form of Fig. 12, the mold 35 is in the general form of a shallow pan, though this is subject to variation depending upon the finally desired form of the article.

Figure 13:
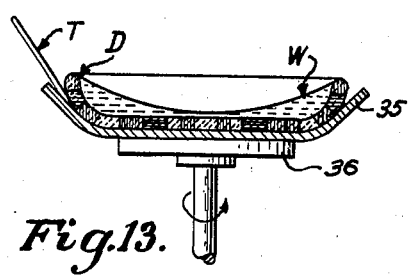
Fig. 13 is a view similar to Fig. 12, but showing the mold in revolution and illustrating a step in the forming operation.
Figure 14:
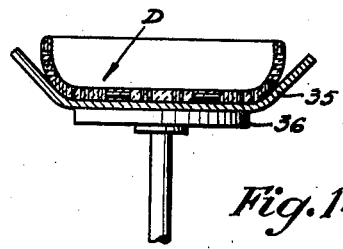
Fig. 14 is a view similar to Fig. 12 but showing a typical form after completion of the molding operation.

The clay having been placed within the form or mold 35, excess material is trimmed off at the edges, and the clay then wetted with water. For example, several cupfuls of water may be poured into the clay within the mold. The potter's wheel and mold are then revolved, and the plastic clay smoothed by pressing or holding a dripping wet cloth against it. The article is next shaped with the use of wet clay modeling tools of any appropriate form, these being first inserted between the plastic clay body and the edge of the mold, so as to turn the side or edge of the bowl or other article inwardly (see Fig. 13, in which a modeling tool is indicated at T), and being then pressed against the revolving clay to shape it to the desired final form (Fig. 14). The mold is used primarily to hold the plastic clay in upright position, rather than to determine the shape of the pottery, the shaping of the article being performed with the wet modeling tools, and the final shape of the article ordinarily being quite independent of the shape of the mold. The modeling tools used may be of any desired type; in the absence of a special tool, the handle of an ordinary spoon may be employed.

After the bowl or pottery has been modeled to the desired contour, it is washed off by dipping the mold containing the modeled bowl or pottery into water, or spraying with water.

It is highly important that the tools and plastic clay articles be flooded with water during the time they are being molded or shaped. See Fig. 13 in which the contained water is indicated at W. This prevents the colored clays from adhering to the hands or tools while modeling or shaping the article in the mold, thus not only keeping the article clean, but eliminating the adhesive condition that otherwise causes the various colored clays in the pottery to run together, blend or blur. Flooding the clay with water eliminates the tendency of the clay to stick to the modeling tool (which incidently may be the hands of the operator) by the provision of a thin film of water which separates the tool from the clay, thereby causing the tool to slip or slide over the wet clay surface much the same as oil causes one piece of metal to slide freely on another. If it were not for the flooding process, the frictional drag of the modeling tool would cause the designs in the clay to smear to a depth of ⅛" or more, and the design as a whole would be distorted and thrown out of balance. The use of water per se is of course not new, as it has been common, for example, for the potter to moisten his hands as he works with the clay on his conventional potter's wheel, or to use a wet sponge to clean the article. The secret of success of the present process is the flooding of the article; the use, in other words, of an excess of water, yielding the novel result of substantial elimination of frictional drag or adhesion between the contacting face of the modeling tool and the clay, whereby distortion of the color pattern owing to such adhesion is overcome. The pottery produced by the present modeling process, which may be described as a wet or water process, is characterized by sharply and clearly defined color patterns, such as have never, to my knowledge, been produced by previously known potter's wheel processes.

The wet modeling process having been completed, the article is dried, and then fired and glazed with a clear transparent glaze, in a usual manner.

The present invention has been illustrated by way of giving one specific example; it will of course be understood that the invention is subject to considerable modification and is to be limited only in accordance with a fair construction of the appended claims.

I claim:

1. The process of producing pottery that comprises forming a half-disk of plastic clay having a color pattern extending from face to face, severing the half-disk along a medial plane parallel to its two faces, thereby producing two half-disks of identical color pattern, and adhesively joining the two half-disks along their diametrical edges, in a manner to match the said identical color patterns on said half-disks.

2. The process of producing pottery that comprises forming a slab of plastic clay having portions of different colors extending therethrough substantially from face to face thereof, severing said slab along a medial plane parallel to its two faces, inverting and orienting one of the halves so produced in such a manner that the faces of the two halves disclose color patterns which are duplicate but reverse with respect to each other, trimming the edges facing each other of the two halves so produced along straight lines such that the reverse duplicate color patterns of the two halves may be matched along said lines to form a complete, balanced design, and adhesively joining the edges of said halves along said straight lines with said reverse duplicate color patterns matched to each other.

3. The process of producing pottery that comprises forming a number of parallel strips of plastic clay of differing colors in a symmetrical arrangement on opposite sides of a center line of symmetry, joining adjacent strips at the edges, severing the clay along said center line, folding one of the resulting halves on the other, with corresponding strips of the two halves in face to face register, and causing the meeting faces of said halves to join, working the mass to modify the color arrangement of the clay, severing the clay along a medial plane parallel to its two faces, inverting and orienting one of the halves so produced in such a manner that the faces of the two halves disclose color patterns which are duplicate but reverse with respect to each other, trimming the edges facing each other of the two halves so produced along a straight line corresponding substantially to the original center line of symmetry, such that the color patterns of the two halves may be matched along said lines, and adhesively joining said halves along said straight lines with said color patterns matched to each other.

4. The process of producing pottery that comprises forming a number of parallel strips of plastic clay of differing colors in a symmetrical arrangement on opposite sides of a center line of symmetry, joining the adjacent strips at the edges, severing the clay along parallel lines at right angles to the first mentioned parallel strips, inserting strips of colored clay between the strips into which the clay mass is thus divided, joining the adjacent strips at the edges, severing the clay along said center line, folding one of the resulting halves on the other, with corresponding members of the first mentioned strips in face to face register and with the second mentioned strips doubled on one another, and causing the meeting faces of said halves to join, working the mass to modify the color arrangement of the clay, severing the clay along a medial plane parallel to its two faces, inverting and orienting one of the halves so produced in such a manner that the faces of the two halves disclose color patterns which are duplicate but reverse with respect to each other, trimming the edges facing each other of the two halves so produced along a straight line corresponding substantially to the original center line of symmetry, such that the color patterns of the two halves may be matched along said lines, and adhesively joining said halves along said straight lines with said color patterns matched to each other.

5. The process of producing pottery that comprises forming a number of parallel strips of plastic clay of differing colors in a symmetrical arrangement on opposite sides of a center line of symmetry, joining adjacent strips at the edges, severing the clay along said center line, folding one of the resulting halves on the other, with corresponding strips of the two halves in face to face register, and causing the meeting faces of said halves to join, working the clay mass inwardly in both directions along the straight cut edge while preserving the general outline form of the mass, severing the clay along a medial plane parallel to its two faces, inverting and orienting one of the halves so produced in such a manner that the faces of the two halves disclose color patterns which are duplicate but reverse with respect to each other, trimming the edges facing each other of the two halves so produced along a straight line corresponding substantially to the original center line of symmetry, such that the color patterns of the two halves may be matched along said lines, and adhesively joining said halves along said straight lines with said color patterns matched to each other.

6. The process of producing a pottery article of predetermined through color pattern, that comprises preparing a pan-cake shaped slab of plastic clay having a predetermined color pattern extending through it substantially from face to face, placing said pan-cake shaped slab in a round pan that is revoluble on its vertical central axis, in such manner that the plastic clay slab assumes a dished shape conforming initially to the shape of the pan, rapidly revolving the pan on its axis, turning a side portion of the dished slab inwardly by inserting a forming instrumentality between the rim of the pan and the external surface of the dished slab and pressing inwardly against the slab, completing the forming of the article by contacting its surface with forming instrumentalities, and maintaining the initial predetermined color pattern intact against circumferential distortion with reference to the axis of revolution of the pan by substantially eliminating frictional drag between the forming instrumentalities and the clay.

7. The process of producing a pottery article of predetermined through color pattern, that comprises preparing a pancake shaped slab of plastic clay having a predetermined color pattern extending through it substantially from face to face, placing said pan-cake shaped slab in a round pan that is revoluble on its vertical central axis, in such manner that the plastic clay slab assumes a dished shape conforming initially to the shape of the pan, rapidly revolving the pan on its axis, turning a side portion of the dished slab inwardly by inserting a forming instrumentality between the rim of the pan and the external surface of the dished slab and pressing inwardly against the slab, completing the forming of the article by contacting its surface with forming instrumentalities, and maintaining the initial predetermined color pattern intact against circumferential distortion with reference to the axis of revolution of the pan by flooding the forming instrumentalities with sufficient excess of water at all times they are in contact with the clay to substantially eliminate frictional drag between the forming instrumentalities and the clay.

SHERIDAN HIGGINS.